(12) United States Patent
Yamamoto

(10) Patent No.: US 9,699,098 B2
(45) Date of Patent: Jul. 4, 2017

(54) COMMUNICATION METHOD, COMMUNICATION SYSTEM, AND COMMUNICATION DEVICE

(71) Applicant: FUJITSU LIMITED, Kawasaki-shi, Kanagawa (JP)

(72) Inventor: Hiroaki Yamamoto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 212 days.

(21) Appl. No.: 14/446,530

(22) Filed: Jul. 30, 2014

(65) Prior Publication Data

US 2015/0055462 A1 Feb. 26, 2015

(30) Foreign Application Priority Data

Aug. 26, 2013 (JP) ................................. 2013-174712

(51) Int. Cl.
*H04L 12/825* (2013.01)
(52) U.S. Cl.
CPC .................................... *H04L 47/25* (2013.01)
(58) Field of Classification Search
CPC ............. H04W 16/08; H04W 72/0453; H04W 72/1242; H04W 72/1252
See application file for complete search history.

(56) References Cited

U.S. PATENT DOCUMENTS

| 2003/0235161 | A1 | 12/2003 | Shoji et al. | |
|---|---|---|---|---|
| 2006/0198396 | A1* | 9/2006 | Chang | H04W 28/06 370/522 |
| 2006/0212730 | A1* | 9/2006 | Senda | G06F 1/32 713/300 |
| 2007/0201461 | A1* | 8/2007 | Shinohara | H04L 45/00 370/389 |
| 2010/0329114 | A1* | 12/2010 | Chesson | H04L 47/27 370/232 |
| 2013/0138830 | A1* | 5/2013 | Fang | H04L 47/263 709/233 |
| 2014/0025970 | A1* | 1/2014 | Shinohara | H04L 12/6418 713/320 |

(Continued)

FOREIGN PATENT DOCUMENTS

| JP | 11-88458 | 3/1999 |
|---|---|---|
| JP | 2002-135314 | 5/2002 |
| JP | 2006-293983 | 10/2006 |

(Continued)

OTHER PUBLICATIONS

Office Action issued by the Japanese Patent Office on Mar. 28, 2017 in corresponding Japanese patent application No. 2013-174712.

*Primary Examiner* — Andrew Chriss
*Assistant Examiner* — Romani Ohri
(74) *Attorney, Agent, or Firm* — Staas & Halsey LLP

(57) ABSTRACT

A communication method includes transmitting a first data from a first communication device to a second communication device, transmitting, from the second communication device to the first communication device, a limiting request that requests limiting of a transmission band from the first communication device to the second communication device, in a case where the data amount of the first data is less than a first threshold value, and executing limiting of the transmission band, based on the limiting request.

12 Claims, 7 Drawing Sheets

(56) References Cited

U.S. PATENT DOCUMENTS

2015/0131557 A1* 5/2015 Knutsen ............... H04L 1/0002
  370/329

FOREIGN PATENT DOCUMENTS

| JP | 2007-228491 | 9/2007 |
| JP | 2009-237933 | 10/2009 |
| JP | 2011-166268 | 8/2011 |

* cited by examiner

COMMUNICATION METHOD, COMMUNICATION SYSTEM, AND COMMUNICATION DEVICE

CROSS-REFERENCE TO RELATED APPLICATION

This application is based upon and claims the benefit of priority of the prior Japanese Patent Application No. 2013-174712, filed on Aug. 26, 2013, the entire contents of which are incorporated herein by reference.

FIELD

The embodiments discussed herein are related to a communication method, a communication system, and a communication device.

BACKGROUND

The processing capacities of communication devices such as Layer 2 switches and routers have improved with an increase in demand for communication. On the other hand, power consumption has increased. Therefore, it is desirable to reduce the power consumption of communication devices.

As for the reduction of the power consumption of communication devices, a technique for changing a clock frequency in response to a packet flow rate is known. In addition, a technique for stopping the supply of power to an inactive port is known.

In addition, a technique where a client requests a server to reduce the transfer rate of data and the client enters a power saving mode after the reduction of the transfer rate is known. In addition, a technique for reducing power consumption by changing the speed of communication between devices is known. Japanese Laid-open Patent Publication No. 2007-228491, Japanese Laid-open Patent Publication No. 11-88458, Japanese Laid-open Patent Publication No. 2009-237933, and Japanese Laid-open Patent Publication No. 2006-293983 discuss such techniques.

SUMMARY

According to an aspect of the invention, a communication method includes transmitting a first data from a first communication device to a second communication device, transmitting, from the second communication device to the first communication device, a limiting request that requests limiting of a transmission band from the first communication device to the second communication device, in a case where the data amount of the first data is less than a first threshold value, and executing limiting of the transmission band, based on the limiting request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a technique for changing a clock frequency in response to a packet flow rate or a technique for stopping the supply of power to an inactive port, it is difficult for the control of the clock frequency or the power supply to follow a rapid increase in a traffic amount, and hence, it is likely that an error such as packet loss occurs. A case where the traffic amount rapidly increases is called a burst traffic input. In addition, in the technique where the client requests the server to reduce the transfer rate of data and the client enters the power saving mode after the reduction of the transfer rate, in a case where traffic exceeding a processing capacity in the power saving mode of the client is input to the client from the server, an error such as packet loss occurs. Furthermore, in a technique for reducing power consumption by changing the speed of communication between devices, when the speed of communication between the devices is changed, a link between the devices is cut off once by a transfer to a loopback mode. Therefore, an error such as packet loss occurs.

The present embodiments provide a communication method, a communication system, and a communication device each of which reduces power consumption without error.

Figure 1:
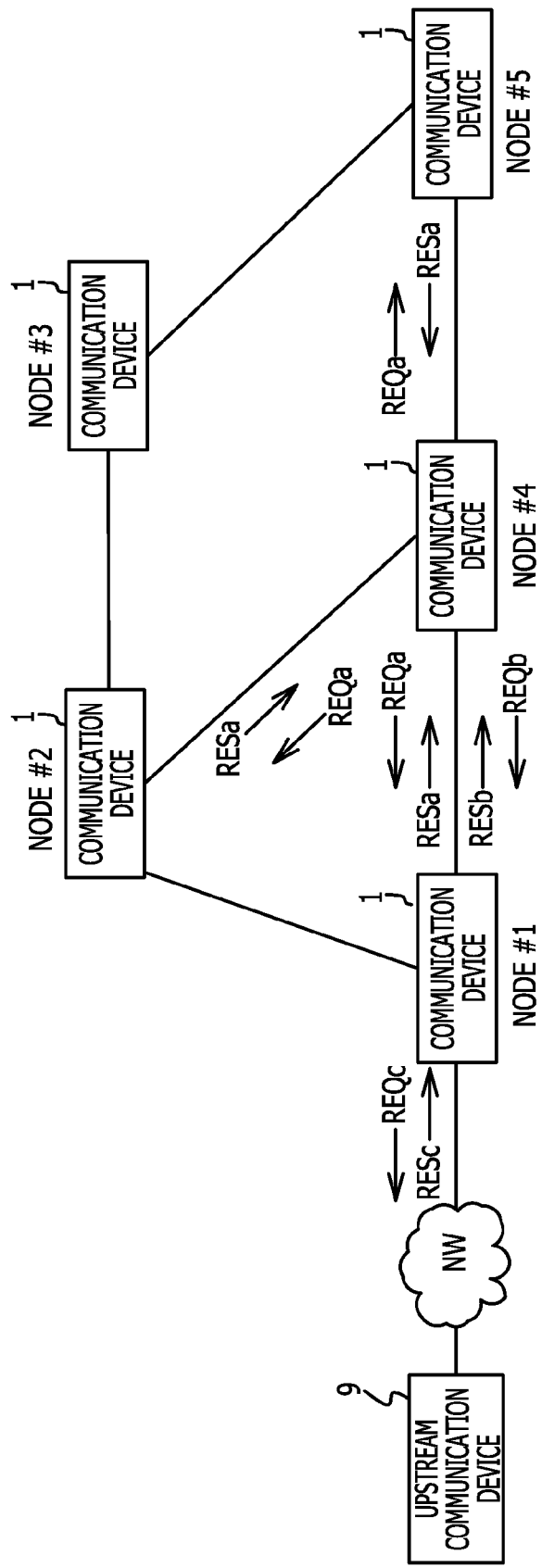
FIG. 1 is a configuration diagram illustrating a network configuration.

FIG. 1 is a configuration diagram illustrating a network configuration. A network serving as a communication system includes nodes #1 to #5 in each of which a communication device 1 according to one of the embodiments is provided. While, in the present embodiment, a router is cited as the communication device 1, the communication device 1 is not limited to this, and may be another communication device such as a Layer 2 switch.

The communication devices 1 in the respective nodes #1 to #5 are connected to one another through a communication channel such as an optical fiber or a Local Area Network (LAN) cable. The communication device 1 in the node #1 is connected to the respective communication devices 1 in the nodes #2 and #4. The communication device 1 in the node #2 is connected to the respective communication devices 1 in the nodes #1, #4, and #3. The communication device 1 in the node #3 is connected to the respective communication devices 1 in the nodes #2 and #5. The communication device 1 in the node #5 is connected to the respective communication devices 1 in the nodes #3 and #4. However, the connection configuration of the network is not limited to this, and may be, for example, a ring-type or star-type configuration. In addition, since each communication device 1 functions as the router, a Layer 2 switch, a personal computer, a server, and so forth are further connected thereto through a LAN (not illustrated).

In addition, the communication device 1 in the node #1 is connected to an upstream communication device 9 through an access network NW. As the upstream communication device 9, for example, a transponder mounted in a wavelength multiplexing transmission device within a backbone network is cited. The communication device 1 in each of the nodes #1 to #5 transfers a packet received from the upstream communication device 9, to another network serving as a destination, and transmits a packet received from another network, to the upstream communication device 9. In addition, while, in the present embodiment, as the packet, an Ethernet (registered trademark) frame is cited, the packet is not limited to this, and may be data based on another format, such as an Asynchronous Transfer Mode (ATM) cell.

The communication device 1 in each of the nodes #1 to #5 processes the flow of packets received from another one of the communication devices 1, and transmits the flow of packets to yet another one of the communication devices 1. Since the speed with which traffic is processed is determined in response to a requested throughput, the speed with which traffic is processed increases with an increase in throughput. Since the speed with which traffic is processed is determined based on the frequency of a clock signal used for traffic processing, power consumption increases with an increase in processing speed. In other words, the processing capacity for traffic and power consumption are in a trade-off relationship.

However, since the amount of traffic flowing in a network changes, the communication device 1 is not desired to continuously have the requested throughput. Therefore, in response to the amount of traffic received from another one of the communication devices 1, the communication device 1 switches an operation mode between a normal mode (first mode) and a low power consumption mode (second mode) in which the speed with which traffic is processed is lower than that in the normal mode, and hence, reduces the power consumption. At this time, by controlling the frequency of the clock signal determining the speed with which traffic is processed, it is possible for the communication device 1 to easily switch the operation mode.

At this time, if the operation mode is switched from the normal mode to the low power consumption mode with a decrease in the traffic amount serving as a trigger, in a case where burst traffic occurs thereafter, it is difficult for the speed with which traffic is processed to follow this, and packet loss occurs.

Therefore, the communication device 1 according to one of the embodiments requests band limiting corresponding to the speed with which traffic is processed in the low power consumption mode, from another one of the communication devices 1 serving as a transmission source of the traffic, and switches to the low power consumption mode after the corresponding one of the communication devices 1 limits the band of the traffic. From this, the communication device 1 reduces the power consumption with no packet loss. In what follows, a case where the communication device 1 in the node #4 switches the operation mode from the normal mode to the low power consumption mode will be cited as an example and described.

The respective communication devices 1 (second communication devices) in the nodes #1, #2, and #5 transmit traffic to the communication device 1 (first communication device) in the node #4. The communication device 1 in the node #4 processes traffic received from the respective communication devices 1 in the nodes #1, #2, and #5. In a case where the relevant traffic amount is smaller than a first threshold value TH1, the communication device 1 in the node #4 transmits requests REQa for band limiting corresponding to the speed with which traffic is processed in the low power consumption mode, to the respective communication devices 1 in the nodes #1, #2, and #5. In addition, in the present specification, the traffic amount means the number of packets per unit time in a case where it is assumed that the lengths of variable packets are equal to one another, or a data amount per unit time.

In response to the band limiting requests REQa from the communication device 1 in the node #4, the respective communication devices 1 in the nodes #1, #2, and #5 limit the bands of traffic transmitted to the communication device 1 in the node #4, in accordance with the speed with which traffic is processed in the low power consumption mode. From this, inputting of burst traffic from the respective communication devices 1 in the nodes #1, #2, and #5 to the communication device 1 in the node #4 is avoided.

In addition, each of the communication devices 1 in the nodes #1, #2, and #5 may acquire the speed with which traffic is processed or the limiting value of a band from the band limiting request REQa serving as a control message received from the communication device 1 in the node #4, and may acquire the speed with which traffic is processed or the limiting value of a band from a memory or the like within the device itself. After performing band limiting, the respective communication devices 1 in the nodes #1, #2, and #5 transmit responses RESa to the communication device 1 in the node #4.

After the communication device 1 in the node #4 receives the responses RESa, in other words, after the respective communication devices 1 in the nodes #1, #2, and #5 limit the bands of traffic in response to the requests, the communication device 1 in the node #4 switches the operation mode from the normal mode to the low power consumption mode. Therefore, it is possible for the communication device 1 to reduce the power consumption with no packet loss. At this time, by causing the frequency of the clock signal to fall below that in the normal mode, the frequency of the clock signal determining the speed with which traffic is processed, the communication device 1 switches the operation mode to the low power consumption mode.

While, in the above-mentioned example, the communication device 1 in the node #4 switches the operation mode from the normal mode to the low power consumption mode with the traffic amount falling below the first threshold value TH1 serving as a trigger, a decrease in the amount of traffic remaining within the device itself and waiting for processing may be used as a trigger. In other words, in a case where the traffic amount is smaller than the first threshold value TH1 and the accumulated amount of traffic waiting for processing is smaller than a second threshold value TH2, the communication device 1 in the node #4 makes a request for band limiting from the respective communication devices 1 in the nodes #1, #2, and #5. From this, by switching the operation mode to the low power consumption mode, a decrease in the throughput of traffic remaining within the communication device 1 in the node #4, in other words, packets accumulated in a buffer, is suppressed.

As long as the operation mode of the communication device 1 in the node #4 is the low power consumption mode, in a case where the amount of traffic addressed to the communication device 1 in the node #4 exceeds a limited band, each of the communication devices 1 in the nodes #1, #2, and #5 accumulates, in a buffer within the device itself, packets corresponding to an amount exceeding the band. Therefore, if the total number of packets accumulated in the buffer increases, there is a possibility that the throughput decreases owing to the band limiting.

Therefore, each of the communication devices 1 in the nodes #1, #2, and #5 detects an increase in the amount of traffic addressed to the communication device 1 in the node #4, and requests the communication device 1 in the node #4 to switch the operation mode from the low power consumption mode to the normal mode. In what follows, the communication device 1 in the node #1 will be cited as an example, and the operation of the communication device 1 in the node #1 will be described.

In a case where the amount of traffic input from another device, for example, the upstream communication device 9, and addressed to the communication device 1 in the node #4 becomes greater than or equal to a predetermined amount B, the communication device 1 in the node #1 transmits a change request REQb for the operation mode, to the communication device 1 in the node #4. In response to the change request REQb for the operation mode, the communication device 1 in the node #4 switches the operation mode from the low power consumption mode to the normal mode. From this, in the communication device 1 in the node #4, the speed with which traffic is processed increases from the low power consumption mode. Upon switching the operation mode from the low power consumption mode to the normal mode, the communication device 1 in the node #4 transmits a mode switching completion notice RESb to the communication device 1 in the node #1.

After the communication device 1 in the node #1 receives the mode switching completion notice RESb, in other words, after the operation mode of the communication device 1 in the node #4 is switched from the low power consumption mode to the normal mode, the communication device 1 in the node #1 cancels a limitation on the band of traffic. From this, an increase in the total number of packets accumulated in the buffer within the communication device 1 in the node #1 is suppressed, and hence, the reduction of throughput is suppressed. In addition, while, in the present example, the communication device 1 in the node #1 has been cited, the same operation may be performed in any one of the nodes #2 and #4.

In addition, while, in the present example, the communication device 1 in the node #1 requests the communication device 1 in the node #4 to change the operation mode with the amount of traffic becoming greater than or equal to the predetermined amount B serving as a trigger, the traffic being input thereto and addressed to the communication device 1 in the node #4, the communication device 1 in the node #1 is not limited to this.

For example, the communication device 1 in the node #1 may transmit, to the upstream communication device 9, a request REQc for traffic information indicating the amount of traffic to be addressed to the communication device 1 in the node #4, and may acquire traffic information RESc from the upstream communication device 9. In addition, in response to the content of the traffic information RESc, the communication device 1 in the node #1 requests the communication device 1 in the node #4 to change the operation mode. In this case, since it is possible for the communication device 1 in the node #1 to confirm the traffic state of the upstream communication device 9 before traffic addressed to the communication device 1 in the node #4 is transmitted from an upstream network to the communication device 1 in the node #1, it is possible to more reliably suppress an increase in the accumulated amount of the buffer.

Figure 2:
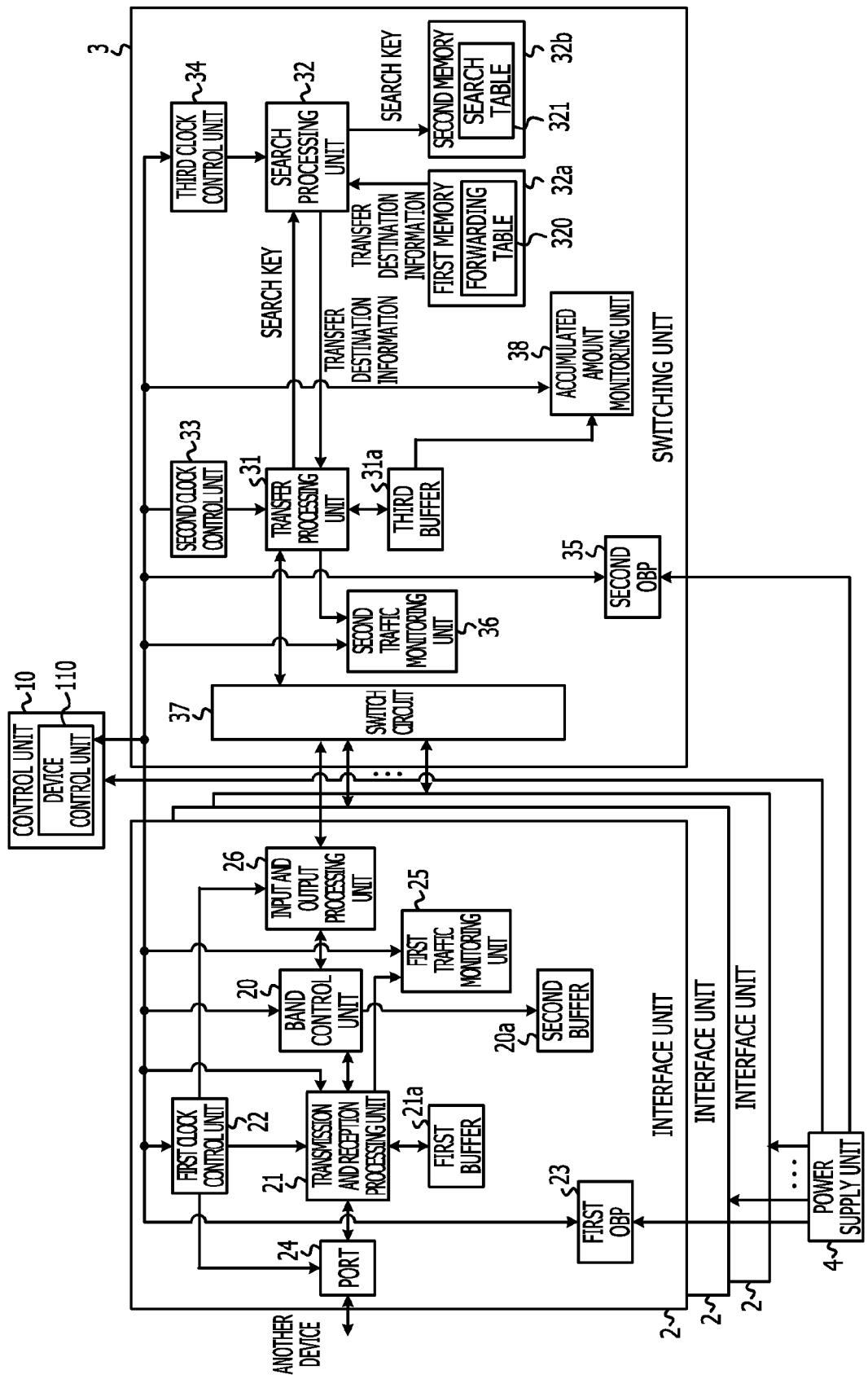
FIG. 2 is a configuration diagram illustrating a functional configuration of a communication device according to an embodiment.

Next, details of the communication device 1 will be described. FIG. 2 is a configuration diagram illustrating the functional configuration of the communication device 1 according to one of the embodiments. The communication device 1 includes a control unit 10, a plurality of interface units 2, a switching unit 3, and a power supply unit 4. The individual units 10, 2, 3, and 4 are inserted into, for example, respective slots provided in the enclosure of the communication device, and are electrically connected to one another through a rear substrate.

The control unit 10 includes a device control unit 110 (mode control unit) that controls the entire device. The device control unit 110 includes a processor such as, for example, a Central Processing Unit (CPU), and controls individual units in each of the interface units 2 in order to execute the above-mentioned operations between the communication devices 1. At this time, the control unit 10 switches the operation mode of the communication device 1 between the normal mode and the low power consumption mode.

Each of the plural interface units 2 transmits and receives packets to and from other communication devices 1. The switching unit 3 switches packets between the plural interface units 2. In addition, the power supply unit 4 supplies electric power to each of the units 10, 2, and 3.

The interface unit 2 includes a port 24, a transmission and reception processing unit 21, a band control unit 20, a first on-board power (OBP) 23, a first clock control unit 22, and a first traffic monitoring unit 25. The interface unit 2 further includes an input and output processing unit 26, a first buffer 21a, and a second buffer 20a. While, in the present embodiment, the interface units 2 are provided so as to correspond to other respective communication devices 1 serving as connection destinations, the interface units 2 are not limited to this, and each of the interface units 2 may be provided so as to correspond to two or more communication devices 1.

The first on-board power 23 has the function of a Direct Current-Direct Current (DC-DC) converter, and converts and supplies the power-supply voltage of the power supply unit 4 to each unit within the interface unit 2. In a case of not causing the interface unit 2 to operate, the first on-board power 23 is controlled by the device control unit 110 so as to stop supplying power.

The port 24 has the function of, for example, a physical layer (PHY Layer), outputs a packet received from another communication device 1, to the transmission and reception processing unit 21, and transmits a packet input from the transmission and reception processing unit 21, to another communication device 1.

The transmission and reception processing unit 21 extracts a data unit from a packet, and outputs the data unit to the band control unit 20. In addition, in an opposite manner, the transmission and reception processing unit 21 configures a packet from a data unit input from the band control unit 20. For example, in a case where the packet is an Ethernet frame, the transmission and reception processing unit 21 extracts an Internet protocol (IP) packet from the Ethernet frame, and configures the Ethernet frame from the IP packet.

In addition, the transmission and reception processing unit 21 processes transmission and reception of a control message with another communication device 1. Examples of the control message include the band limiting request REQa, the response RESa, the mode change request REQb, and the mode switching completion notice RESb in the above-mentioned communication activity, and the request REQc for the traffic information and the traffic information RESc with respect to the upstream communication device 9. The transmission and reception processing unit 21 outputs, to the device control unit 110, a control message received from another communication device 1, and outputs a control message generated by the device control unit 110, to another communication device 1 through the port 24. In addition, since the control messages are transmitted and received using a band fixed and different from that for other packets, for example, a control channel, the control messages are not lost in communication. The first buffer 21*a* accumulates therein packets waiting for processing to be performed by the transmission and reception processing unit 21.

The first traffic monitoring unit 25 monitors the amount of traffic input to the transmission and reception processing unit 21, and notifies the device control unit 110 of the traffic amount.

The band control unit 20 limits the band of traffic output to the switching unit 3, using, for example, a policing function. In addition, based on an instruction of the device control unit 110, the band control unit 20 limits the band of traffic output to another communication device 1, using, for example, a shaping function.

In a case of being requested to perform band limiting by another communication device 1, in other words, the communication device 1 in the node #4 in the above-mentioned example, the band control unit 20 limits the band of traffic transmitted to the relevant communication device 1. The second buffer 20*a* accumulates therein IP packets waiting for transmission processing for the band control of the transmission and reception processing unit 21. During limiting of a band, from among IP packets accumulated in the second buffer 20*a*, the band control unit 20 selects, on a priority basis, a packet where a request for a delay time is strict similar to a packet of, for example, a voice over Internet protocol (VoIP), in other words, a low-delay packet, and outputs the packet to the transmission and reception processing unit 21.

The input and output processing unit 26 inputs and outputs IP packets to and from the switching unit 3. The switching unit 3 transfers IP packets to the respective interface units 2 corresponding to the destinations thereof.

In accordance with control by the device control unit 110, the first clock control unit 22 controls the frequencies of the clock signals of the port 24, the transmission and reception processing unit 21, and the input and output processing unit 26. In a case where the device control unit 110 switches the operation mode from the normal mode to the low power consumption mode, the frequencies of the clock signals of the port 24, the transmission and reception processing unit 21, and the input and output processing unit 26 are changed to values lower than those in the normal mode. Therefore, in the low power consumption mode, the processing speeds of the port 24, the transmission and reception processing unit 21, and the input and output processing unit 26 become lower than those in the normal mode.

The switching unit 3 includes a transfer processing unit 31 (traffic processing unit), a third buffer 31*a*, a search processing unit 32, a first memory 32*a*, a second memory 32*b*, a second clock control unit 33, and a third clock control unit 34. The switching unit 3 further includes a second On-Board Power (OBP) 35, a second traffic monitoring unit 36, a switch circuit 37, and an accumulated amount monitoring unit 38.

The second on-board power 35 has the function of a DC-DC converter, and converts and supplies the power-supply voltage of the power supply unit 4 to each unit within the switching unit 3. In a case of not causing the switching unit 3 to operate, the second on-board power 35 is controlled by the device control unit 110 so as to stop supplying power.

The switch circuit 37 is connected to the input and output processing unit 26 in each of the interface units 2. The switch circuit 37 outputs, to the transfer processing unit 31, IP packets input from the input and output processing unit 26, and outputs IP packets input from the transfer processing unit 31, to the respective interface units 2 corresponding to the destinations thereof.

The transfer processing unit 31 processes traffic received from another communication device 1. The transfer processing unit 31 acquires, from the search processing unit 32, the destination of an IP packet, in other words, transfer destination information. Therefore, the transfer processing unit 31 outputs, to the search processing unit 32, the IP address of the IP packet as a search key. The search processing unit 32 searches for the transfer destination information, based on the search key, and outputs the transfer destination information to the transfer processing unit 31. The transfer processing unit 31 assigns, for example, the transfer destination information to the IP packet, and outputs the transfer destination information to the switch circuit 37. The third buffer 31*a* accumulates therein traffic waiting for processing to be performed by the transfer processing unit 31, in other words, IP packets.

Based on the search key input from the transfer processing unit 31, the search processing unit 32 searches a search table 321 held in the second memory 32*b*. In the search table 321, a plurality of IP addresses and a plurality of pointers are stored while being associated with each other. Accordingly, the search processing unit 32 acquires, from the search table 321, a pointer corresponding to an IP address serving as a search key.

Based on a pointer acquired from the search table 321, the search processing unit 32 searches a forwarding table 320 held in the first memory 32*a*. In the forwarding table 320, a plurality of pointers and a plurality of pieces of packet processing information are stored while being associated with each other. Accordingly, the search processing unit 32 acquires, from the forwarding table 320, a piece of packet processing information corresponding to a pointer. The packet processing information includes a piece of transfer destination information indicating the transfer destination of an IP packet.

In this way, the transfer processing unit 31 performs search processing for the transfer destination information for each IP packet, using the search processing unit 32, and hence, power consumption increases with an increase in a traffic amount to be processed. Accordingly, as describe later, the device control unit 110 switches the operation mode from the normal mode to the low power consumption mode in response to a monitoring result of a traffic amount.

The second traffic monitoring unit 36 monitors the amount of traffic processed by the transfer processing unit 31. When, based on a monitoring result of the second traffic monitoring unit 36, the device control unit 110 detects that the traffic amount is smaller than the first threshold value TH1, the device control unit 110 requests another communication device 1 to perform band limiting corresponding to the processing speed of the transfer processing unit 31 in the low power consumption mode. Here, the other communication device 1 is the communication device 1 in the node #1, #2, or #5 in the example of FIG. 1. The device control unit 110 transmits the control message REQa for requesting band limiting, to the other communication device 1 through the transmission and reception processing unit 21. In addition, the device control unit 110 may determine a traffic amount using a monitoring result of the first traffic monitoring unit 25 in addition to the monitoring result of the second traffic monitoring unit 36.

In addition, the transfer processing unit 31 may determine a traffic amount using a monitoring result of the accumulated amount monitoring unit 38 in addition to the monitoring result of the second traffic monitoring unit 36. In this case, the accumulated amount monitoring unit 38 monitors the accumulated amount of traffic (IP packets) accumulated in the third buffer 31a.

In a case where it is detected, based on the monitoring result of the second traffic monitoring unit 36, that a traffic amount is smaller than the first threshold value TH1, the device control unit 110 acquires the monitoring result from the accumulated amount monitoring unit 38. In addition, in a case where it is detected, based on the monitoring result of the accumulated amount monitoring unit 38, that an accumulated amount is smaller than the second threshold value TH2, the transfer processing unit 31 transmits, to the other communication device 1, the control message REQa for requesting band limiting. From this, the device control unit 110 suppresses a decrease in the throughput of traffic remaining within the communication device 1, in other words, IP packets accumulated in the third buffer 31a.

In a case of receiving, through the transmission and reception processing unit 21, the control message REQa for requesting band limiting, from another communication device 1, in other words, the communication device 1 in the node #4 in the above-mentioned example, the device control unit 110 limits the band of traffic transmitted to the relevant communication device 1, by controlling the band control unit 20. In response to the speeds with which traffic is processed in the transfer processing unit 31 and the search processing unit 32 in the low power consumption mode, the device control unit 110 limits a band. After performing the band limiting, the device control unit 110 transmits the response RESa to the other communication device 1 through the transmission and reception processing unit 21.

From this, inputting of burst traffic from the communication device 1 to the other communication device 1 is avoided. In addition, the device control unit 110 may acquire the speed with which traffic is processed or the limiting value of a band, from a control message for requesting band limiting, and may acquire the speed with which traffic is processed or the limiting value of a band, from a memory within the device itself.

After another communication device 1 limits the band of traffic in response to the request, the device control unit 110 switches the operation mode from the normal mode to the low power consumption mode by controlling the first clock control unit 22, the second clock control unit 33, and the third clock control unit 34. At this time, the second clock control unit 33 and the third clock control unit 34 control the frequencies of the clock signals of the transfer processing unit 31 and the search processing unit 32, respectively.

In accordance with the control by the device control unit 110, the second clock control unit 33 and the third clock control unit 34 control the frequencies of the clock signals of the transfer processing unit 31 and the search processing unit 32 so that the frequencies of the clock signals of the transfer processing unit 31 and the search processing unit 32 become values corresponding to the operation mode. Since the frequencies of the clock signals in the low power consumption mode are lower than those in the normal mode, the processing speeds of the transfer processing unit 31 and the search processing unit 32 in the low power consumption mode are reduced. However, power consumption is kept lower than that in the normal mode.

In this way, since the device control unit 110 switches the operation mode to the low power consumption mode after another communication device 1 limits a band, it is possible to reduce the power consumption without the occurrence of packet loss.

In addition, based on a monitoring result of the second traffic monitoring unit 36, the device control unit 110 determines whether or not the amount of traffic is greater than or equal to the predetermined amount B, the traffic being input from another device and addressed to another communication device 1 operating in the low power consumption mode, in other words, the communication device 1 in the node #4 in the example of FIG. 1. In a case where the relevant traffic amount becomes greater than or equal to the predetermined amount B, the device control unit 110 requests the communication device 1 in the low power consumption mode to change the operation mode. At this time, the device control unit 110 transmits the control message REQb for requesting changing of the operation mode, to the relevant communication device 1 through the transmission and reception processing unit 21. In addition, as described above, in response to the content of the traffic information REScacquired from the upstream communication device 9, the device control unit 110 may transmit the control message REQb for requesting changing of the operation mode.

In the communication device 1 operating in the low power consumption mode, in response to the control message REQb for requesting changing of the operation mode, the device control unit 110 switches the operation mode from the low power consumption mode to the normal mode. In other words, in a case of receiving, through the transmission and reception processing unit 21, a control message for requesting changing of the operation mode, the device control unit 110 controls the first clock control unit 22, the second clock control unit 33, and the third clock control unit 34. Since the frequencies of the clock signals in the normal mode are higher than those in the low power consumption mode, the processing speeds of the transfer processing unit 31 and the search processing unit 32 in the normal consumption mode are increased. However, power consumption becomes higher than that in the normal mode.

In addition, after switching the operation mode to the normal mode, the device control unit 110 transmits, through the transmission and reception processing unit 21, the mode switching completion notice RESb to the communication device 1 that has requested changing of the operation mode. In the communication device 1 serving as a transmission destination, the mode switching completion notice RESb is received by the device control unit 110 through the transmission and reception processing unit 21.

After receiving the mode switching completion notice RESb, the device control unit 110 cancels a limitation on the band of traffic, by controlling the band control unit 20. From this, an increase in the accumulated amounts of of traffic in the second buffer 20a and the third buffer 31a is suppressed, and hence, the reduction of throughput is suppressed.

Figure 3:
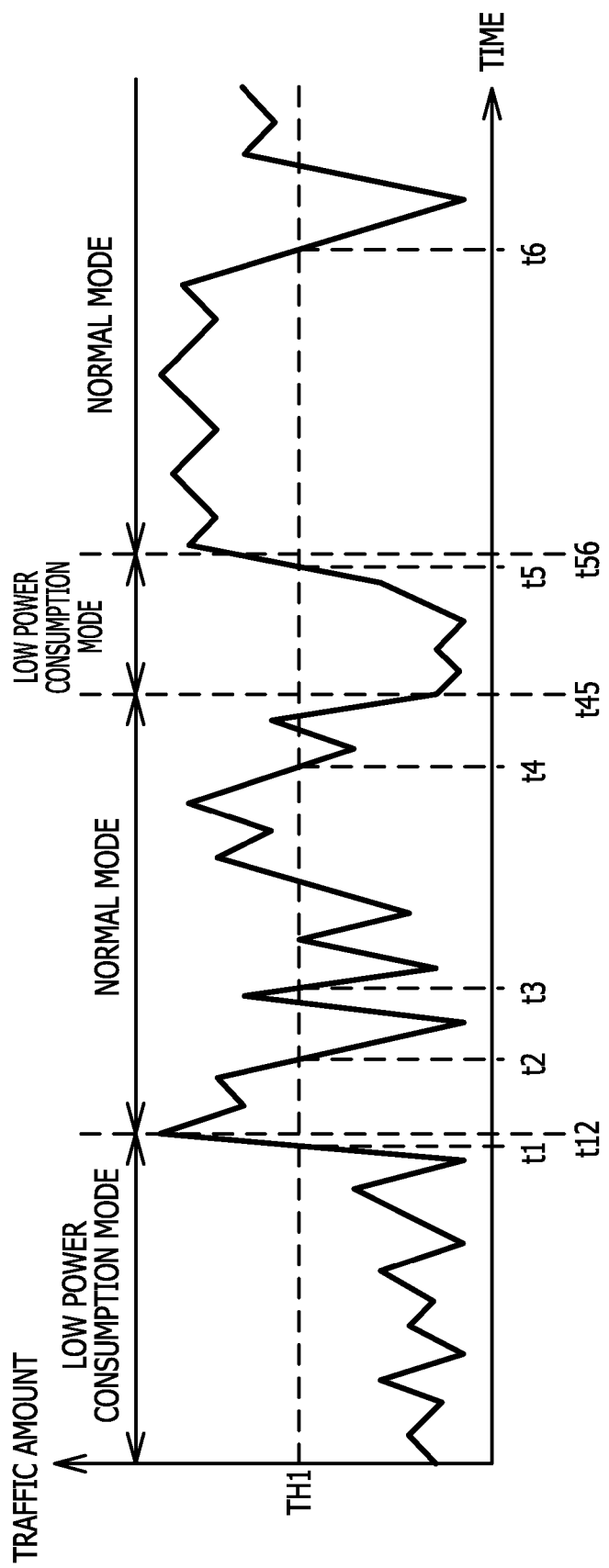
FIG. 3 is a graph illustrating an example of a temporal change in traffic amount.

According to the above-mentioned configuration, it is possible for the device control unit 110 to adequately switch the operation mode in response to the amount of traffic processed by the transfer processing unit 31. FIG. 3 is a graph illustrating an example of a temporal change in traffic amount. In FIG. 3, the horizontal axis indicates time, and the vertical axis indicates the amount of traffic processed by the transfer processing unit 31.

If, at a time t1, in a second communication device 1 in an adjacent node, it is detected that the amount of traffic addressed to a first communication device 1 increases and becomes greater than or equal to the predetermined amount B, the first communication device 1 receives the mode change request REQb. From this, at a time t12, the first communication device 1 switches the operation mode from the low power consumption mode to the normal mode.

At a time t45, the first communication device 1 detects that the amount of traffic processed by the transfer processing unit 31 becomes smaller than the first threshold value TH1 and the accumulated amount of the third buffer 31a becomes smaller than the second threshold value TH2. From this, the first communication device 1 transmits the band limiting request REQa to the second communication device 1 in the adjacent node, and switches the operation mode from the normal mode to the low power consumption mode after executing band limiting.

If, at a time t5, in the second communication device 1 in the adjacent node, it is detected that the amount of traffic addressed to the first communication devices 1 increases and becomes greater than or equal to the predetermined amount B, the first communication device 1 receives the mode change request REQb. From this, at a time t56, the first communication device 1 switches the operation mode from the low power consumption mode to the normal mode.

In addition, at a time t2, t3, t4, or t6, the first communication device 1 detects that a traffic amount becomes smaller than the first threshold value TH1. However, since the accumulated amount of the third buffer 31a is larger than the second threshold value TH2, the first communication device 1 does not switch the operation mode. The reason is that, as described above, if the operation mode is switched to the low power consumption mode, the throughput of IP packets accumulated in the third buffer 31a is lowered by the reduction of the processing speed of the transfer processing unit 31.

Accordingly, when a state where a traffic amount is small continues to some extent, the operation mode of the first communication device 1 is switched from the normal mode to the low power consumption mode. Therefore, the occurrence of a fluctuation of a packet, caused by frequent switching of the operation mode, or the occurrence of packet loss, caused by a poor following capability of the control of a clock signal, is avoided.

Figure 4:
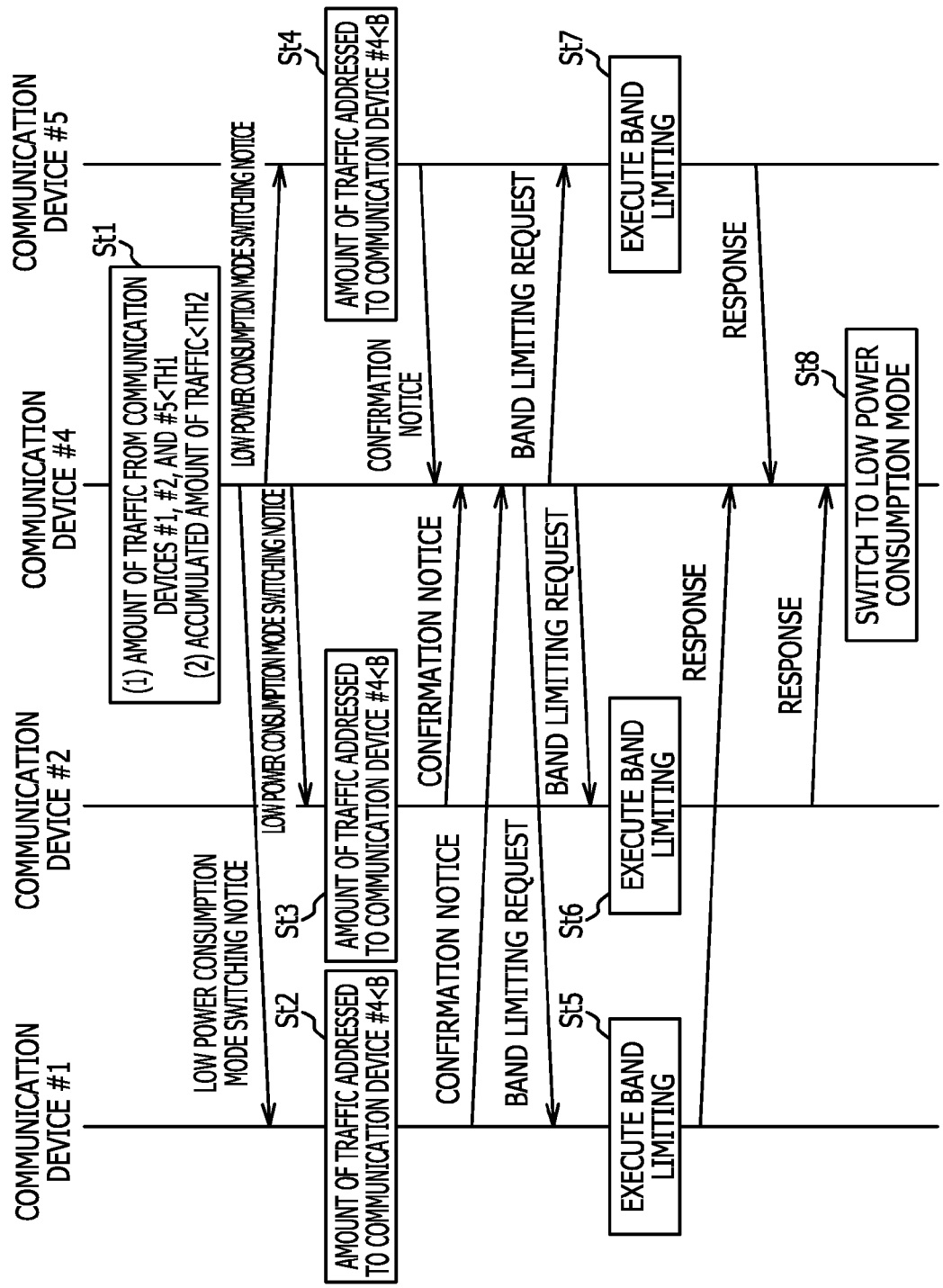
FIG. 4 is a ladder chart illustrating an example of communication between communication devices in a case where an operation mode is switched to a low power consumption mode.

Next, details of a sequence between the communication devices 1 will be described with reference to FIG. 4 to FIG. 6. In FIG. 4 and FIG. 6, the communication devices 1 in the nodes #1, #2, #4, and #5 illustrated in FIG. 1 are expressed by a "communication device #1", a "communication device #2", a "communication device #4", and a "communication device #5", respectively. In accordance with this, in the following description referring to FIG. 4 to FIG. 6, the communication devices 1 in the nodes #1, #2, #4, and #5 are expressed by the "communication device #1", the "communication device #2", the "communication device #4", and the "communication device #5", respectively.

FIG. 4 is a ladder chart illustrating an example of communication between the communication devices 1 in a case where the operation mode is switched to the low power consumption mode. First, the communication device #4 detects that the amount of traffic from the communication devices #1, #2, and #5 in adjacent nodes is smaller than the first threshold value TH1 (condition (1)) and the accumulated amount of traffic in the third buffer 31a is smaller than the second threshold value TH2 (condition (2)) (step St1). At this time, the device control unit 110 in the communication device #4 determines the condition (1), based on a monitoring result of the second traffic monitoring unit 36, and determines the condition (2), based on a monitoring result of the accumulated amount monitoring unit 38.

Next, the device control unit 110 in the communication device #4 transmits, to the communication devices #1, #2, and #5, low power consumption mode switching notices each giving notice of switching the operation mode to the low power consumption mode. In addition, the low power consumption mode switching notices are transmitted, as control messages, through the transmission and reception processing unit 21.

Next, upon receiving the low power consumption mode switching notice, each of the communication devices #1, #2, and #5 checks the amount of traffic input from another device and addressed to the communication device #4, and detects that the relevant traffic amount is smaller than the predetermined amount B (steps St2, St3, and St4). At this time, based on a monitoring result of the second traffic monitoring unit 36, the device control unit 110 in each of the communication devices #1, #2, and #5 determines whether or not the amount of traffic input from the other device and addressed to the communication device #4 is smaller than the predetermined amount B. In addition, the predetermined amount B is determined based on, for example, the first threshold value TH1.

Next, the communication devices #1, #2, and #5 transmit confirmation notices to the communication device #4. In addition, the confirmation notices are each transmitted, as a control message, through the transmission and reception processing unit 21.

Next, upon receiving the confirmation notices from the respective communication devices #1, #2, and #5, the communication device #4 transmits, to the communication devices #1, #2, and #5, the band limiting requests REQa each requesting band limiting corresponding to the speed with which traffic is processed in the low power consumption mode. In other words, while making it a condition that the confirmation notices are received from the respective communication devices #1, #2, and #5 in all the adjacent nodes so that packet loss does not occur, the communication device #4 transmits the band limiting requests REQa. Therefore, as described later, if the confirmation notice is not received from any one of the communication devices #1, #2, and #5 in the adjacent nodes, the band limiting requests REQa are not transmitted.

Next, the communication devices #1, #2, and #5 each execute band limiting in response to the band limiting request REQa (steps St5, St6, and St7). At this time, by controlling the band control unit 20, the device control unit 110 in each of the communication devices #1, #2, and #5 limits the band of traffic transmitted to the communication device #4, in response to the speed with which traffic is processed in the low power consumption mode. Based on this band limiting, inputting of burst traffic to the communication device #4 is suppressed.

Figure 5:
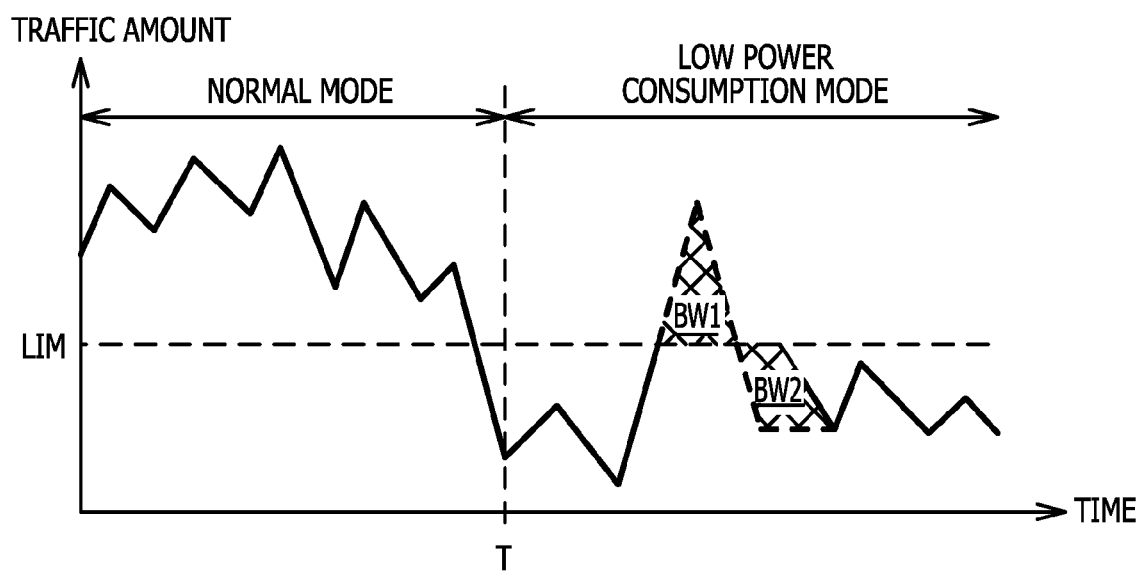
FIG. 5 is a graph illustrating an example of a temporal change in traffic amount in a case where burst traffic is suppressed by band limiting.
Figure 6:
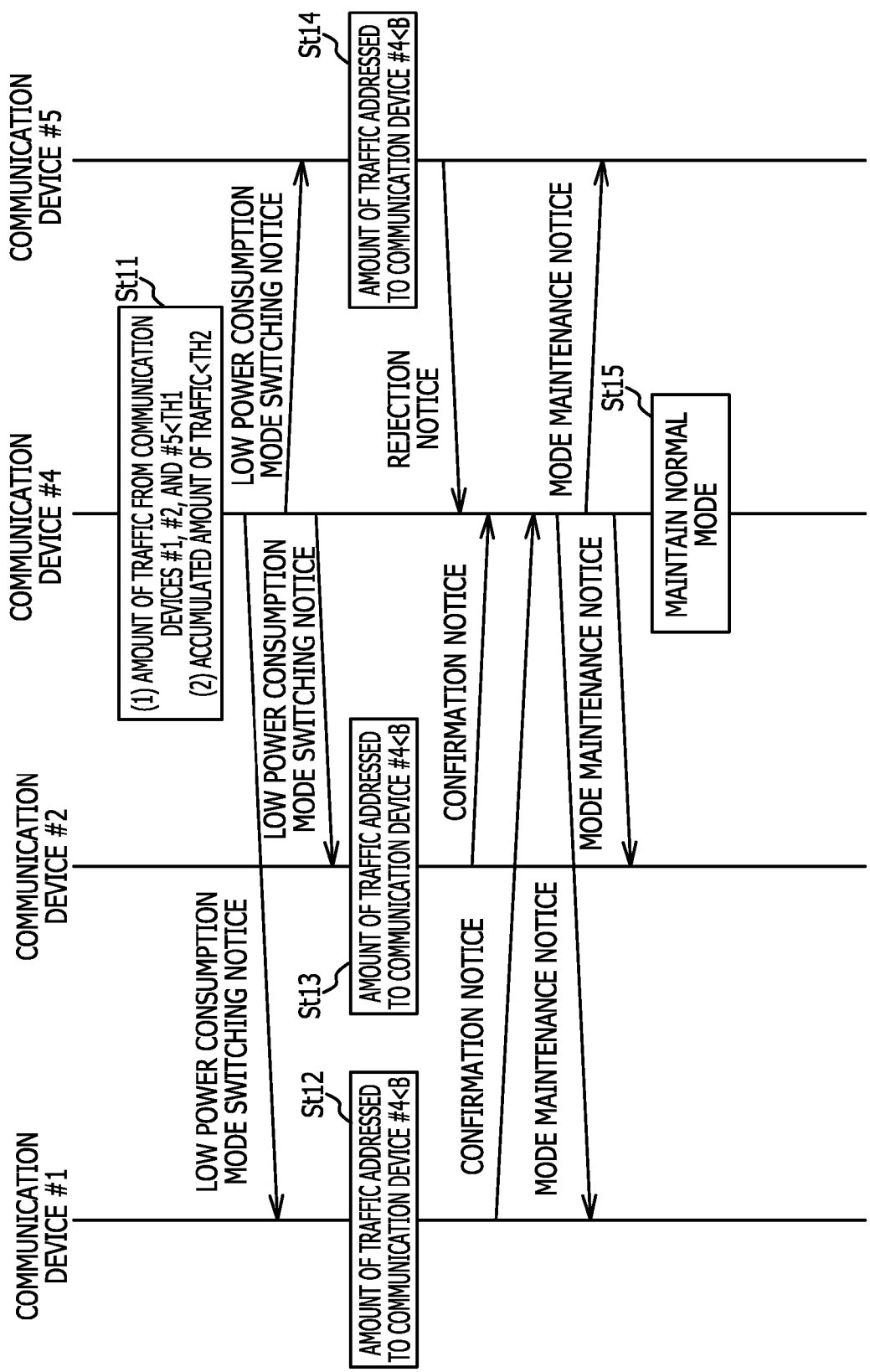
FIG. 6 is a ladder chart illustrating an example of communication between communication devices in a case where the operation mode is maintained at a normal mode.

FIG. 5 is a graph illustrating an example of a temporal change in traffic amount in a case where burst traffic is suppressed by band limiting. In FIG. 5, the horizontal axis indicates time, and the vertical axis indicates the amount of traffic processed by the transfer processing unit 31.

Since, at a time T, the traffic amount is reduced, and becomes smaller than the first threshold value TH1, the communication device #4 switches the operation mode from the normal mode to the low power consumption mode. In a case where, after that, burst traffic occurs while the traffic amount is reduced, if the communication devices #1, #2, and

5 do not perform band limiting, the amount of traffic input to the communication device #4 exceeds a band limiting value LIM, as illustrated by a symbol BW1. Since, in the low power consumption mode, the processing speed of the transfer processing unit 31 is lower than that in the normal mode, packet loss occurs owing to the burst traffic BW1 having a traffic amount exceeding the processing speed of the transfer processing unit 31.

However, even in a case where burst traffic occurs, if the communication devices #1, #2, and #5 perform band limiting, the traffic amount is suppressed so as to be less than or equal to the band limiting value LIM, as illustrated by a symbol BW2. Therefore, the traffic amount is temporally smoothed, and hence does not exceed the processing speed of the transfer processing unit 31. Accordingly, the communication devices #1, #2, and #5 perform band limiting, and hence, it is possible to avoid packet loss in the communication device #4.

Referring to FIG. 4 again, next the communication devices #1, #2, and #5 each transmit the response RESa to the communication device #4 after executing band limiting. Next, upon receiving the responses RESa from the respective communication devices #1, #2, and #5, the communication device #4 switches the operation mode to the low power consumption mode (step St8). In other words, after the communication devices #1, #2, and #5 each limit the band of traffic in response to the band limiting request REQa, the device control unit 110 in the communication device #4 switches the operation mode to the low power consumption mode. Therefore, no packet loss occurs owing to switching of the operation mode. In this way, the communication device 1 switches the operation mode to the low power consumption mode.

In addition, FIG. 6 is a ladder chart illustrating an example of communication between the communication devices 1 in a case where the operation mode is maintained at the normal mode. First, the communication device #4 detects that the amount of traffic from the communication devices #1, #2, and #5 in the adjacent nodes is smaller than the first threshold value TH1 (condition (1)) and the accumulated amount of traffic in the third buffer 31a is smaller than the second threshold value TH2 (condition (2)) (step St11). Next, the device control unit 110 in the communication device #4 transmits, to the communication devices #1, #2, and #5, low power consumption mode switching notices each giving notice of switching the operation mode to the low power consumption mode.

Next, upon receiving the low power consumption mode switching notice, each of the communication devices #1 and #2 checks the amount of traffic input from another device and addressed to the communication device #4, and detects that the relevant traffic amount is smaller than the predetermined amount B (steps St12 and St13). Next, the communication devices #1 and #2 transmit confirmation notices to the communication device #4.

On the other hand, upon receiving the low power consumption mode switching notice, the communication device #5 checks the amount of traffic input from another device and addressed to the communication device #4, and detects that the relevant traffic amount is greater than or equal to the predetermined amount B (step St14). Next, the communication device #5 transmits a rejection notice to the communication device #4. In addition, the rejection notice is transmitted, as a control message, through the transmission and reception processing unit 21.

In a case of having received the rejection notice from at least one communication device 1 from among the communication devices #1, #2, and #5 in the adjacent nodes, the communication device #4 interrupts switching of the operation mode. Therefore, the communication device #4 transmits, to the communication devices #1, #2, and #5, normal mode maintenance notices each giving notice of maintaining the operation mode at the normal mode. At this time, the normal mode maintenance notices are each transmitted, as a control message, through the transmission and reception processing unit 21. In addition, even if the communication devices #1, #2, and #5 receive normal mode maintenance notices, the communication devices #1, #2, and #5 do not execute band limiting.

In addition, the communication device #4 maintains the operation mode at the normal mode (step St15). In this way, in a case of switching the operation mode to the low power consumption mode, the communication device #4 makes it a condition that the confirmation notices are received from the respective communication devices #1, #2, and #5 in all the adjacent nodes. Therefore, the loss of a packet input from the communication device #5 is avoided. In this way, the communication device 1 maintains the operation mode at the normal mode.

Figure 7:
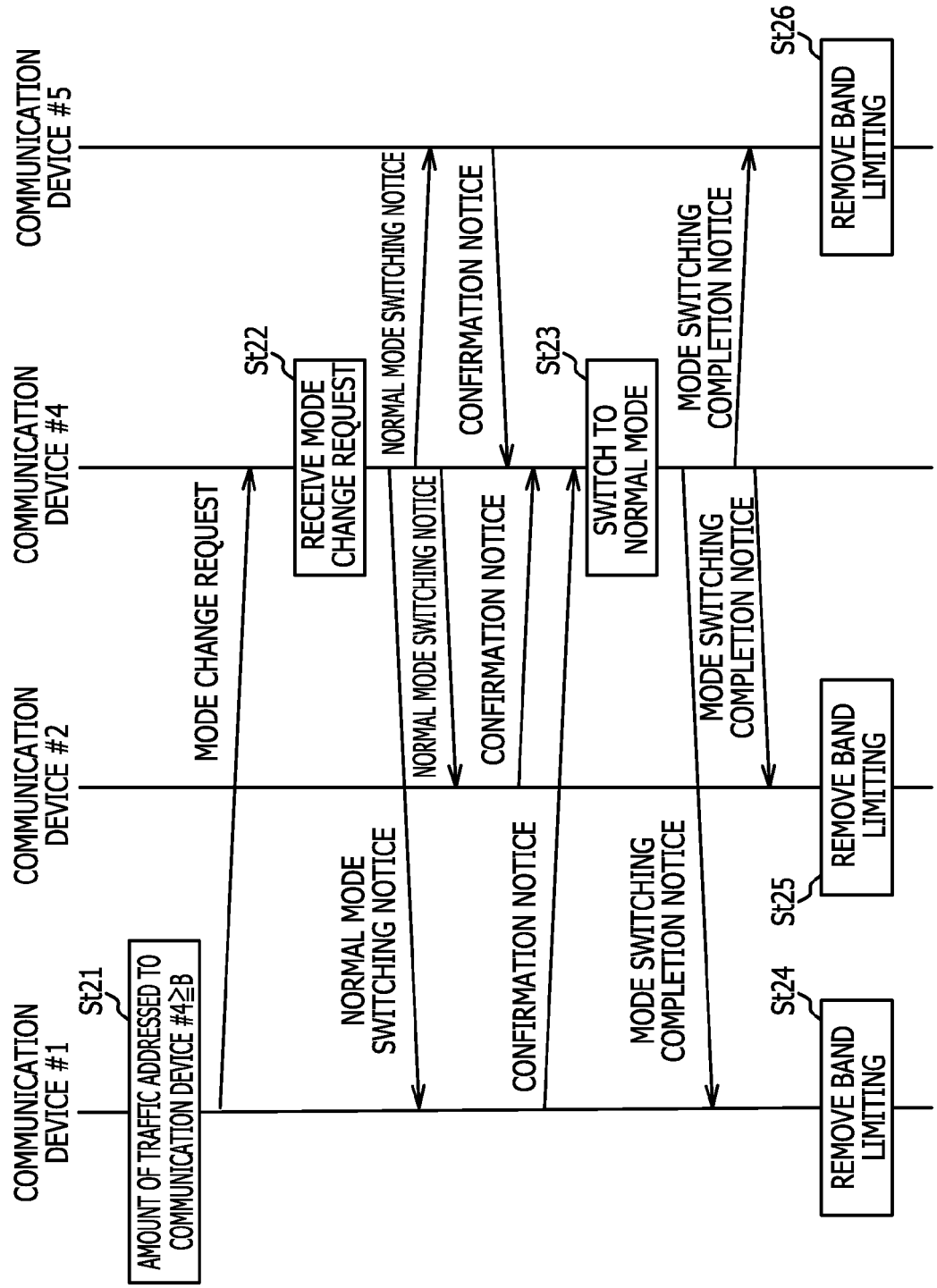
FIG. 7 is a ladder chart illustrating an example of communication between communication devices in a case where the operation mode is switched to the normal mode.

In addition, FIG. 7 is a ladder chart illustrating an example of communication between the communication devices 1 in a case where the operation mode is switched to the normal mode. First, the communication device #1 detects that the amount of traffic input from another device and addressed to the communication device #4 is greater than or equal to the predetermined amount B (step St21). At this time, based on a monitoring result of the second traffic monitoring unit 36, the device control unit 110 in the communication device #1 determines whether or not the amount of traffic addressed to the communication device #4 is greater than or equal to the predetermined amount B.

Next, the communication device #1 transmits the mode change request REQb to the communication device #4. Next, the communication device #4 receives the mode change request REQb (step St22). At this time, the device control unit 110 in the communication device #4 receives the mode change request REQb through the transmission and reception processing unit 21.

Next, the communication device #4 transmits normal mode switching notices to the respective communication devices #1, #2, and #5 in the adjacent nodes. In addition, the normal mode switching notices are transmitted, as control messages, through the transmission and reception processing unit 21.

Next, upon receiving the normal mode switching notices, the communication devices #1, #2, and #5 each transmit a confirmation notice to the communication device #4. In addition, the confirmation notices are each transmitted, as a control message, through the transmission and reception processing unit 21.

Next, upon receiving the confirmation notices from the respective communication devices #1, #2, and #5, the communication device #4 switches the operation mode from the low power consumption mode to the normal mode (step St23). Next, the communication device #4 transmits the mode switching completion notices RESb to the respective communication devices #1, #2, and #5.

Next, upon receiving the mode switching completion notices RESb, the communication devices #1, #2, and #5 individually cancel band limiting (steps St24, St25, and St26). Here, the communication devices #1, #2, and #5 cancel band limiting after the operation mode of the communication device #4 is switched from the low power consumption mode to the normal mode. Therefore, no packet loss occurs. In this way, the communication device 1 switches the operation mode to the normal mode.

As described above, the communication method according to one of the embodiments is a communication method performed between the first communication device (the communication device #4) and the second communication device (the communication device #1, #2, or #5). The first communication device switches an operation mode between a first mode (the normal mode) and a second mode (the low power consumption mode) where the speed with which traffic is processed is lower than that in the first mode. The second communication device transmits traffic to the first communication device.

The first communication device processes the traffic received from the second communication device, and in a case where the relevant traffic amount is smaller than the first threshold value TH1, the first communication device requests the second communication device to perform band limiting corresponding to the speed with which traffic is processed in the second mode. In response to the relevant request from the first communication device, the second communication device limits the band of the traffic transmitted to the first communication device in accordance with the speed with which traffic is processed in the second mode. After the second communication device limits the band of the traffic in response to the request, the first communication device switches the operation mode from the first mode to the second mode.

In the communication method according to one of the embodiments, in a case where the amount of traffic received from the second communication device is smaller than the first threshold value TH1, the first communication device requests the second communication device to perform band limiting according to the speed with which traffic is processed in the second mode before switching to the second mode. In response to the request, the second communication device limits the band of the traffic transmitted to the first communication device in accordance with the speed with which traffic is processed in the second mode.

Accordingly, the amount of traffic transmitted from the second communication device to the first communication device is limited to an amount processable by the first communication device in the second mode where the speed with which traffic is processed is lower than that in the first mode.

In addition, after the band of the traffic transmitted by the second communication device is limited, the first communication device switches the operation mode from the first mode to the second mode. In other words, after the amount of traffic transmitted from the second communication device to the first communication device is limited to an amount processable by the first communication device in the second mode, the operation mode of the second communication device is switched to the second mode. Therefore, an error such as a packet error does not occur.

In addition, since the second communication device only limits a band, a link between the first communication device and the second communication device is not cut off. Furthermore, inputting of burst traffic into the first communication device is avoided by band limiting in the second communication device. Therefore, it is possible for the first communication device to perform control for switching the operation mode, without incident.

Since the speed with which traffic is processed in the second mode is lower than that in the first mode, the first communication device switches the operation mode from the first mode to the second mode, and hence, power consumption is reduced. Therefore, according to the communication method according to one of the embodiments, it is possible to reduce power consumption without error.

In addition, the communication system according to one of the embodiments includes the first communication device (the communication device #4) and the second communication device (the communication device #1, #2, or #5). The first communication device switches an operation mode between a first mode (the normal mode) and a second mode (the low power consumption mode) where the speed with which traffic is processed is lower than that in the first mode. The second communication device transmits traffic to the first communication device.

The first communication device processes the traffic received from the second communication device, and in a case where the relevant traffic amount is smaller than the first threshold value TH1, the first communication device requests the second communication device to perform band limiting corresponding to the speed with which traffic is processed in the second mode. In response to the relevant request from the first communication device, the second communication device limits the band of the traffic transmitted to the first communication device in accordance with the speed with which traffic is processed in the second mode. After the second communication device limits the band of the traffic in response to the request, the first communication device switches the operation mode from the first mode to the second mode.

Since the communication system according to one of the embodiments has the same configuration as that of the above-mentioned communication method, the communication system according to one of the embodiments achieves the same function effect as the above-mentioned content.

In addition, the communication device according to one of the embodiments includes the transfer processing unit 31 (a traffic processing unit), the second traffic monitoring unit 36 (a traffic monitoring unit), and the device control unit 110 (a mode control unit). The traffic processing unit 31 processes traffic received from another device. The traffic monitoring unit 36 monitors the relevant traffic amount. The mode control unit 110 switches the operation mode between a first mode (the normal mode) and a second mode (the low power consumption mode) where the speed with which traffic is processed is lower than that in the first mode.

In a case where it is detected, based on a monitoring result of the second traffic monitoring unit 36, that a traffic amount is smaller than the first threshold value TH1, the device control unit 110 requests the other device to perform band limiting corresponding to the processing speed of the traffic processing unit 31 in the second mode. In addition, after the other device limits the band of traffic in response to the relevant request, the mode control unit 110 switches the operation mode from the first mode to the second mode.

Since the communication device according to one of the embodiments has the same configuration as that of the above-mentioned communication method, the communication device according to one of the embodiments achieves the same function effect as the above-mentioned content.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method using a first communication device and a second communication device, the method comprising:
   transmitting a first data from the first communication device to the second communication device;
   receiving, by the second communication device, the first data;
   processing, by the second communication device, the received first data in a first mode;
   determining, by the second communication device, whether a data amount of the received first data is less than a first threshold value;
   transmitting, from the second communication device to the first communication device, a limiting request that requests limiting of a transmission band from the first communication device to the second communication device, when the second communication device determines that the data amount of the first data is less than the first threshold value;
   executing limiting of a transmission band of the first communication device, based on the limiting request;
   after executing the limiting of the transmission band of the first communication device, transmitting a limiting execution notice indicating execution of the limiting of the transmission band of the first communication device from the first communication device to the second communication device;
   after the second communication device receives the limiting execution notice, switching an operation mode of the second communication device from the first mode to a second mode based on the limiting execution notice, a power consumed by the second communication device in the second mode being lower than a power consumed by the second communication device in the first mode;
   transmitting a second data from the first communication device to the second communication device after the executing the limiting of the transmission band of the first communication device;
   processing, by the second communication device, the second data in the second mode;
   comparing a data amount of a third data with a second threshold value after performing the limiting;
   transmitting, from the first communication device to the second communication device, a switching request that requests to switch from the second mode to the first mode when the data amount of the third data is greater than the second threshold value;
   executing switching of the operation mode of the second communication device from the second mode to the first mode, in response to the switching request;
   cancelling the limiting of the transmission band; and
   transmitting the third data from the first communication device to the second communication device after switching from the second mode to the first mode is executed.

2. The communication method according to claim 1, wherein
   switching of the operation mode of the second communication device is performed by controlling a frequency of a clock signal used for the processing.

3. The communication method according to claim 1, wherein
   the limiting request is transmitted from the second communication device to the first communication device when the data amount of the first data is less than the first threshold value and a data accumulated amount waiting for processing is less than a third threshold value.

4. A communication system comprising:
   a first communication device including a first interface circuit and a first processor coupled to the first interface circuit; and
   a second communication device including a second interface circuit and a second processor coupled to the second interface circuit, the second processor being configured to perform communication with the first communication device via the second interface circuit and the first interface circuit,
   wherein
   the second communication device receives a first data from the first communication device and processes the first data in a first mode,
   the second communication device determines whether a data amount of the received first data is less than a first threshold value,
   when the second communication device determines that the data amount of the first data is less than the first threshold value, the second communication device transmits, to the first communication device, a limiting request that requests limiting of a transmission band from the first communication device to the second communication device,
   the first communication device executes limiting of the transmission band of the first communication device, based on the limiting request,
   after executing the limiting of the transmission band of the first communication device, the first communication device transmits a limiting execution notice indicating execution of the limiting of the transmission band of the first communication device to the second communication device,
   after the second communication device receives the limiting execution notice, the second communication device switches an operation mode of the second communication device from the first mode to a second mode based on the limiting execution notice, a power consumed by the second communication device in the second mode being lower than a power consumed by the second communication device in the first mode,
   the first communication device transmits a second data to the second communication device after executing the limiting of the transmission band of the first communication device,
   the second communication device processes the second data in the second mode,
   the first communication device compares a data amount of a third data transmitted to the second communication device with a second threshold value after performing the limiting of the transmission band,
   the first communication device transmits, to the second communication device, a switching request that requests to switch from the second mode to the first mode when the data amount of the third data is greater than the second threshold value,
   the second communication device executes switching from the second mode to the first mode, in response to the switching request, and
   the first communication device cancels the limiting of the transmission band, and transmits the third data to the second communication device after the second communication device switches the operation mode from the second mode to the first mode.

5. The communication system according to claim 4, wherein
the second communication device switches an operation mode between the first mode and the second mode by controlling a frequency of a clock signal used for the processing.

6. The communication system according to claim 4, wherein
the second communication device transmits the limiting request to the first communication device in a case where the data amount of the first data is less than the first threshold value and a data accumulated amount waiting for processing is less than a third threshold value.

7. A communication device comprising:
a data processing circuit configured to process a first data, in a first mode, received from another communication device;
a data amount monitor circuit configured to monitor a data amount of the first data; and
a control circuit configured to control a power consumed by the data processing circuit, wherein
the communication device transmits, to the another communication device, a limiting request that requests limiting of a transmission band from the another communication device to the communication device, when the data amount monitored by the data amount monitor circuit is less than a first threshold value,
the communication device receives, from the another communication device, a limiting execution notice that indicates an executing the limiting of the transmission band,
after the communication device receives the limiting execution notice, the control circuit switches an operation mode of the communication device from the first mode to a second mode based on the limiting execution notice, the power consumed by processing circuit in the second mode being lower than the power consumed by processing circuit in the first mode,
the communication device receives a second data from the another communication device after switching the operation mode,
the data processing circuit processes the second data in the second mode,
the communication device receives, from the another communication device, a switching request that requests to switch from the second mode to the first mode when a data amount of a third data received by the communication device is greater than a second threshold value, after the another communication device performs the limiting of the transmission band,
the control circuit executes switching from the second mode to the first mode, in response to the switching request, and
the communication device receives, from the another communication device after the another communication device cancels the limiting of the transmission band, the third data after the control circuit switches the operation mode from the second mode to the first mode.

8. The communication device according to claim 7, further comprising:
an accumulation circuit that accumulates therein data waiting for processing in the data processing circuit; and
an accumulated-amount monitor circuit that monitors an accumulated amount of data accumulated in the accumulation circuit,
wherein the control circuit transmits the limiting request to the another communication device when the data amount monitored by the data amount monitor circuit is less than the first threshold value and the accumulated amount monitored by the accumulated-amount monitor circuit is less than second threshold value.

9. The communication device according to claim 7, wherein
the control circuit reduces the processing speed by controlling an operating frequency of the data processing circuit.

10. The method according to claim 1, wherein
the first mode is a normal mode, and
the second mode is a power saving mode.

11. The communication system according to claim 4, wherein
the first mode is a normal mode, and
the second mode is a power saving mode.

12. The communication device according to claim 7, wherein
the first mode is a normal mode, and
the second mode is a power saving mode.

* * * * *